Figure 1:
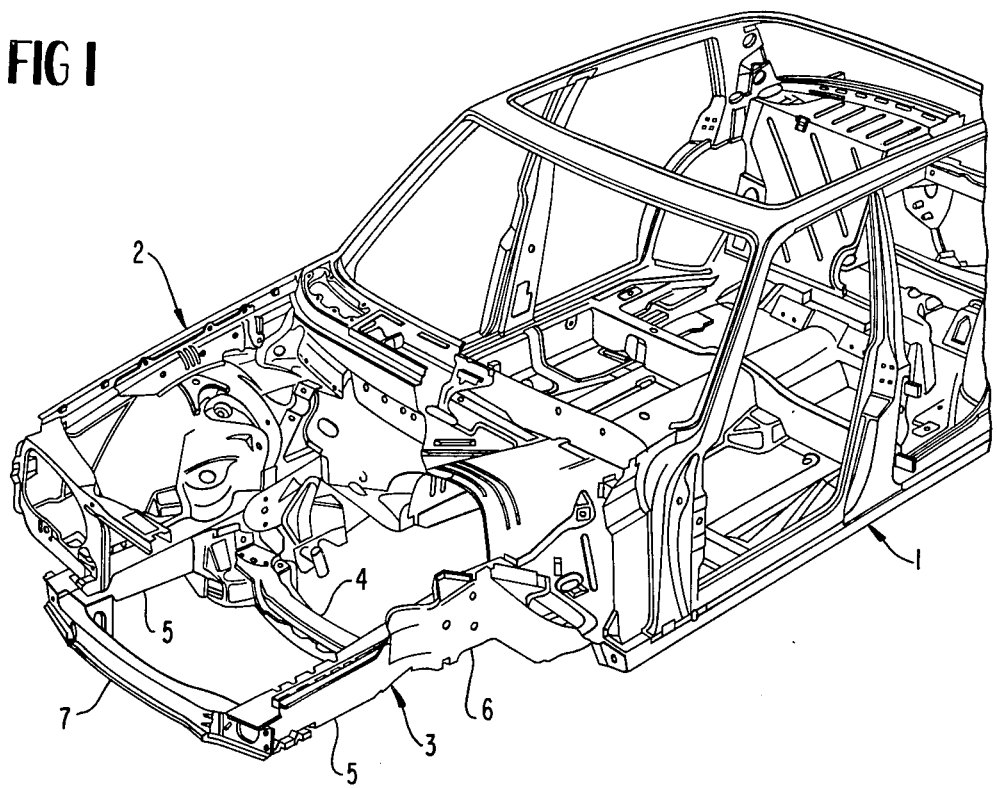

United States Patent [19]

Reidelbach et al.

[11] 4,194,763

[45] Mar. 25, 1980

[54] HOLLOW BEARER FOR VEHICLES

[75] Inventors: Willi Reidelbach, Sindelfingen; Hermann Renner, Magstadt; Wolfgang Klie, Korntal, all of Fed. Rep. of Germany

[73] Assignee: Daimler-Benz Aktiengesellschaft, Fed. Rep. of Germany

[21] Appl. No.: 818,268

[22] Filed: Jul. 22, 1977

[30] Foreign Application Priority Data

Aug. 14, 1976 [DE] Fed. Rep. of Germany ....... 2636655

[51] Int. Cl.$^2$ ............................................ B62D 21/02
[52] U.S. Cl. ..................................... 280/784; 296/189
[58] Field of Search ................. 296/28 F; 280/106 R, 280/784, 785, 786

[56] References Cited

U.S. PATENT DOCUMENTS

| | | | |
|---|---|---|---|
| 3,794,348 | 2/1974 | Fischer | 280/784 |
| 3,860,258 | 1/1975 | Feustel et al. | 280/784 |

*Primary Examiner*—Richard A. Bertsch
*Attorney, Agent, or Firm*—Craig and Antonelli

[57] ABSTRACT

A bearer, especially a longitudinal bearer of a motor vehicle frame, which is constructed as hollow profile and includes a deformable section dissipating impact energy; the walls of the longitudinal bearer have different strength characteristics as a result of a treatment of these areas changing the strength of the wall material compared to non-treated areas; a greater strength thereby exists in the treated wall areas than in the untreated areas.

12 Claims, 2 Drawing Figures

U.S. Patent

Mar. 25, 1980

4,194,763

HOLLOW BEARER FOR VEHICLES

The present invention relates to a bearer constructed as hollow profile, especially to a longitudinal bearer of a motor vehicle frame, with a deformable section dissipating impact energy, whose walls possess area-wise different strength properties by reason of a treatment of these areas changing the strength and rigidity of the wall material as compared to untreated areas.

Present-day passenger motor vehicles possess a very form-rigid passenger cell and chassis structures with an intentional yieldingness which are arranged in front and to the rear of the passenger cell. The chassis structures are intended to deform in case of a collision and are to dissipate thereby the impact energy over a certain distance and time. Bearers of the aforementioned type are thereby provided in the chassis structures. For example, the German Offenlegungsschrift No. 2,429,496 illustrates such a bearer. The walls of the hollow profile are thereby constructed rectilinear in the bearer longitudinal direction. The prior publications for constructing such deformable bearers always provided an aimed-at, intentional local weakening of the bearer walls for the initiation of bulging or buckling in the case of a collision. Since, however, the bearer must have a predetermined minimum strength for its normal bearer function and thus the deformation force has a predetermined high value remaining as constant as possible over the deformation path, it was necessary heretofore to impart to the bearer weakened in this respect by the weakening places, a sufficient bearing strength on the basis of a correspondingly large dimensioning of the wall thickness. The local weakening, desirable as such, had to be therefore compensated by a certain extra in wall thickness. As a result thereof, the bearer becomes heavy and expensive and the requirements in raw material, in this case, steel, is increased; as to the rest, any increase in vehicle weight also represents an increase in fuel consumption.

It is the aim of the present invention to indicate measures how bearers of the aforementioned type can be constructed more light-weight without loss in function. The underlying problems are solved according to the present invention with a bearer of the aforementioend type in that a higher strength is produced in the treated wall areas than in the untreated areas (base strength).

The so-called weak places now have the base strength of the bearer and the non-weakened treated areas of the bearer have a higher rigidity or strength. However, it is important that the material still remains deformable within this area at room temperatures and was not strengthened possibly up to the embrittlement. A bearer according to the present invention of identical dimensions and wall thicknesses as a customary prior art bearer has therefore a greater strength and therefore a higher energy- absorption capacity. Or, with the same bearer capacity or with the same energy-absorption capacity, a bearer according to the present invention can be constructed more light-weight than a prior art bearer.

In case of damage, initially the softer, non-treated areas at the hollow bearer which possess the base strength will buckle or bulge and will fold. If a further deformation of the non-treated areas is no longer attainable, then with a continuing collision force the adjoining treated, stronger areas, starting from the already formed buckles and folds, will also bulge or buckle. By reason of this stepped bulging or buckling under different forces, a larger energy-absorption capacity of the bearer is achieved.

The treated areas extend strip-shaped in the circumferential direction about the hollow bearer. Appropriately, several treated areas of high strength are arranged one behind the other at a distance from one another. A larger number of weaker areas disposed therebetween results therefrom, in which the bulging or buckling can commence.

In order to obtain as high an energy absorption capacity of the bearer as possible, it is appropriate if the ratio of treated to adjoining untreated area which can be determined for each area, increases from area to area in the direction toward longitudinal positions of the bearer located toward the vehicle center. By reason of this construction, the bearer strength increases in the direction of the impact direction, i.e., at first the bearer sections located in the impact area will bulge or buckle and in the further course of the collision only the sections disposed further to the rear will then buckle or bulge.

Hollow bearers of the type in question are formed as a rule of at least two profile or sheet metal members which are connected with each other into a closed bearer profile along flange seams extending at least in coarse approximation in the bearer longitudinal direction. Such flange seams are relatively stiff and may prevent or delay a bulging or buckling by reason of their rigidity. In order to counteract this influence, provision may be made that the flange seams are closed exclusively within the area of the higher rigidity and, as to the rest, are non-closed.

The present invention is also concerned with a method for the manufacture of such bearers and in this regard is concerned with the task to propose different methods which are particularly suitable therefor. The increase in strength of the treated areas can take place by cold-work hardening and by suitable heat treatment. These methods may be applied prior to or after the manufacture of the bearer. A particularly appropriate manufacturing method resides, however, in subjecting the sheet-metal cuts necessary for the bearer prior to the deformation of the sheet metal into profile shape, area-wise at least once to a cold-work hardening operation, especially to a bending treatment, which does not change or changes only insignificantly the sheet metal thickness. Sheet metal members may be bent to and fro inside of the areas to be treated possibly several times over bending edges of predetermined curvature length and predetermined radius of curvature. With this method, the strips of increased strength may be placed parallel or transversely to the rolling direction of the sheet metal. Longitudinal strips with increased strength may also be produced on a quasi-endless band adapted to be rolled up, by possibly multiple, temporary longitudinal grooves by means of rollers or drawing dies and by a subsequent flat-rolling or flat-drawing. Strips with higher strength properties may be manufactured in a similar manner on a steel band adapted to be rolled up by predetermined local heat treatment. With the way the roll operates, the strips of increased strength extend parallel to the rolling direction which then later on comes to lie in the circumferential direction of the bearer.

Sometimes, however, it is not acceptable by reason of the complicated blank of the sheet metal, of which a hollow bearer consists, and/or by reason of the size of the sheet metal plates, which are used for its manufacture, to apply to the sheet metal member a local intentional cold-work hardening prior to the manufacture of the hollow bearer. For that reason, it may also be occasionally appropriate to subject the completely manufactured hollow profile to a local intentional heat-treatment for improving the material quality and thereby strengthening the same.

In order to assure that also the areas with increased strength still remain permanently deformable and are able to dissipate energy, the treatment for the increase of the material strength is extended only so far that the material still remains capable of flowing at room temperatures within the treated areas.

Accordingly, it is an object of the present invention to provide a hollow bearer for vehicles and a method for manufacturing the same which avoids by simple means the aforementioned shortcomings and drawbacks encountered in the prior art.

Another object of the present invention resides in a hollow bearer which obviates the need for compensating for local weakened areas intentionally imparted to the bearer, by an unnecessary increase in the wall thickness of the bearer.

A further object of the present invention resides in a longitudinal bearer of the type described above which can be manufactured in a relatively simple and inexpensive manner and which eliminates excess weight and unwarranted costs.

A still further object of the present invention resides in a longitudinal bearer which can be constructed more light-weight without loss in desirable characteristics.

Figure 2:
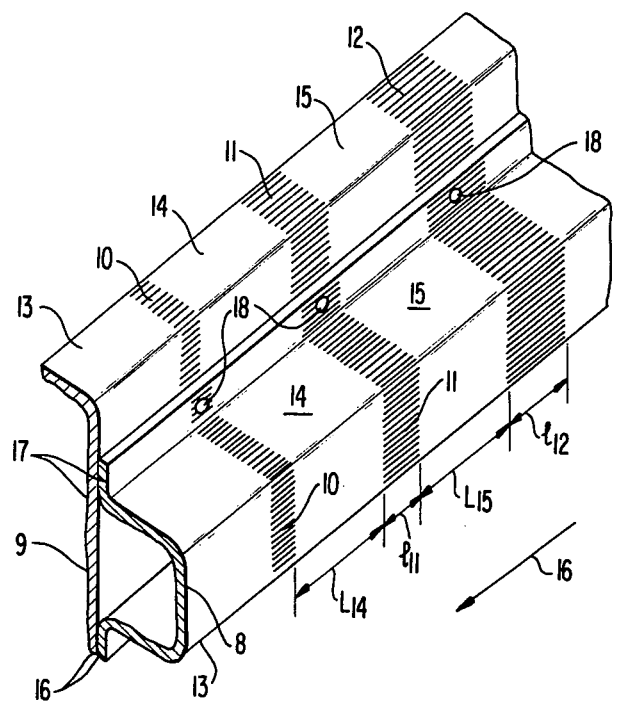

These and other objects, features and advantages of the present invention will become more apparent from the following description when taken in connection with the accompanying drawing which shows, for purposes of illustration only, one embodiment in accordance with the present invention and wherein:

FIG. 1 is a perspective view of a passenger motor vehicle body with a bearer in accordance with the present invention; and FIG. 2 is a partial perspective view of an individual bearer according to the present invention shown in a similar perspective view as one of the longitudinal bearers of FIG. 1.

Referring now to the drawing wherein like reference numerals are used throughout the two views to designate like parts, the illustrated passenger motor vehicle body includes a form-stable passenger cell generally designated by reference numeral 1 and a front structure generally designated by reference numeral 2 which, in case of collision, is adapted to be deformed in a predetermined manner, as well as correspondingly constructed rear structure. An essential component of the frame of the self-supporting body is a pair of longitudinal bearers generally designated by reference numeral 3 constructed as hollow profile, which are connected with each other, inter alia, by a cross bearer 4 and which consist within the area of the front structure of two sections, whose one outer section 5 is located in front of the cross bearer 4, i.e., in the direction toward the vehicle outer end, and whose other inner section 6 lies inside of the cross bearer 4. Within the area of the forward cross bearer 4, the body is supported on the front axle (not shown), i.e., the inner longitudinal bearer 6 must absorb together with other supporting parts of the self-supporting body, the vehicle weight. The outer longitudinal bearers 5 which may be once more connected at their outer sides by a transverse girder 7 carry essentially together with adjoining body parts exclusively the body parts disposed in front of the cross bearer 4 and absorb the longitudinal impacts onto the bumper.

In addition to the other supporting body parts, above all the bearers of the body and of those, especially the longitudinal bearers are so constructed that they bulge or buckle in case of an impact load and yield under absorption and dissipation of the impact energy. The energy- absorption capacity during the buckling or crash period is thereby to remain as uniformly as possible at a predetermined, relatively high but tolerable level. Simultaneously therewith, however, the bearers are not to be unnecessarily heavy and thick-walled.

For this reason, the longitudinal bearer is constructed in the course of its walls and in its wall construction without weakened places. On the other hand, by reason of a non-homogenous rigidity and strength of the walls 8 and 9 of the bearer, it is assured as such that during an impact load above a critical limit value, the bearer begins to buckle or bulge at predetermined locally limited places of the bearer, whereby the bulging or buckling process continues from these buckling or bulging places until the entire wall is buckled or bulged. According to the present invention, strip-shaped areas 10, 11, and 12 which extend in the circumferential direction are provided at the walls 8 and 9 of the bearer, which by reason of an intentional local treatment of the material, possess a higher strength than the wall sections 13, 14 and 15 disposed therebetween. This treatment may be a cold-work hardening or a hardening heat-treatment. The material characteristics, however, must not be driven to the point of embrittlement. In order that the bearer has a rigidity which increases in the direction toward the vehicle center—the arrow 16 (FIG. 2) points outwardly toward the vehicle end—, the treated areas are wider in the direction toward the vehicle center than the areas disposed more closely toward the vehicle end. The ratio of the lengths $l_{12}$ and $L_{15}$ of the areas 12 to 15 ($l_{12}/L_{15}$) is larger than the corresponding ratio $l_{11}/L_{14}$ of the areas 11 to 14.

The two wall parts 8 and 9 are connected with each other by means of two flange seams 16 and 17 extending in the bearer longitudinal direction. The spot welded points 18 establishing the connection are provided only in the treated zones 10, 11 and 12 so that the bearer is able to bulge or buckle possibly without impairment in the seam areas disposed therebetween.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A motor vehicle body construction having a longitudinal bearer which comprises a deformable section dissipating impact energy whose wall means possess area-wise strength characteristics which are different by reason of a treatment of areas changing the strength of the wall material thereof compared to non-treated areas, characterized in that a higher strength exists in the treated wall areas than in the untreated areas.

2. A bearer according to claim 1, characterized in that the untreated areas possess the base strength of the bearer.

3. A bearer according to claim 1, characterized in that the bearer is a longitudinal bearer of a motor vehicle frame which is located within the area of the frame near a respective vehicle end.

4. A bearer according to claim 1, with treated areas extending strip-shaped in the circumferential direction of the bearer, characterized in that several treated areas are provided at the bearer, one behind the other at a distance from one another.

5. A bearer according to claim 4, characterized in that the ratio of treated surface to adjoining non-treated surface which can be determined for each area increases from area to area in the direction toward the longitudinal positions of the bearer located toward the vehicle center.

6. A bearer according to claim 5, which is formed at least of two members, which are connected with each other into a closed bearer profile along flange seams extending at least approximately in the bearer longitudinal direction, characterized in that the flange seams are closed exclusively within the areas of the higher strength and, as to the rest, are non-connected.

7. A bearer according to claim 6, characterized in that the two members are profile members.

8. A bearer according to claim 6, characterized in that the two members are sheet-metal members.

9. A bearer according to claim 1, characterized in that the ratio of treated surface to adjoining non-treated surface which can be determined for each area increases from area to area in the direction toward the longitudinal positions of the bearer located toward the vehicle center.

10. A bearer according to claim 1, which is formed at least of two members, which are connected with each other into a closed bearer profile along flange seams extending at least approximately in the bearer longitudinal direction, characterized in that the flange seams are closed exclusively within the areas of the higher strength and, as to the rest, are non-connected.

11. A bearer according to claim 1, wherein said treated wall areas have been treated by being subjected to cold-work hardening prior to having been formed into a profile shape.

12. A bearer according to claim 1, wherein the treated wall areas have been treated by being subjected to a local, aimed at heat treatment for strengthening the material.

* * * * *